United States Patent
Stähl in et al.

(10) Patent No.: US 11,263,832 B2
(45) Date of Patent: Mar. 1, 2022

(54) DATA TRANSFER DEVICE AND METHOD FOR TRANSFERRING DATA FOR A VEHICLE

(71) Applicant: Continental Teves AG & Co. oHG, Frankfurt am Main (DE)

(72) Inventors: Ulrich Stähl in, Rochester, MI (US); Marc Menzel, Weimar (DE)

(73) Assignee: Continental Teves AG & Co. oHG

( * ) Notice: Subject to any disclaimer, the term of this patent is extended or adjusted under 35 U.S.C. 154(b) by 280 days.

(21) Appl. No.: 16/606,836

(22) PCT Filed: Apr. 26, 2018

(86) PCT No.: PCT/DE2018/200039
§ 371 (c)(1),
(2) Date: Oct. 21, 2019

(87) PCT Pub. No.: WO2018/196930
PCT Pub. Date: Nov. 1, 2018

(65) Prior Publication Data
US 2020/0043251 A1 Feb. 6, 2020

(30) Foreign Application Priority Data
Apr. 28, 2017 (DE) ...................... 10 2017 207 285.7

(51) Int. Cl.
*G07C 5/00* (2006.01)
*H04W 4/44* (2018.01)
(Continued)

(52) U.S. Cl.
CPC ........... *G07C 5/008* (2013.01); *B60W 40/105* (2013.01); *H04L 67/12* (2013.01); *H04W 4/44* (2018.02)

(58) Field of Classification Search
CPC .......... G07C 5/008; H04W 4/44; H04W 4/40; H04L 67/12; B60W 40/105
See application file for complete search history.

(56) References Cited

U.S. PATENT DOCUMENTS 8,676,273 B1 * 3/2014 Fujisaki ................ H04M 3/533
455/567
9,721,469 B2 8/2017 Grotendorst et al.
(Continued)

FOREIGN PATENT DOCUMENTS

DE 102014216796 A1 2/2015
JP 2013066115 A 4/2013

OTHER PUBLICATIONS

German Search Report for German Application No. 10 2017 207 285.7, with partial translation, dated Nov. 15, 2017—11 pages.
(Continued)

*Primary Examiner* — Mary Cheung
(74) *Attorney, Agent, or Firm* — RatnerPrestia

(57) ABSTRACT

A data transfer device for transferring data in a communications network for a vehicle, includes a data receiving device, and a data processing device. The data processing device is configured to filter received data via a filter device based on a predetermined condition, and the data processing device is configured to generate at least one data object with at least one parameter from the filtered data. The data processing device is further configured to check whether or not status information of the at least one parameter of the at least one data object has changed relative to status information of this at least one parameter of this at least one data object at an earlier time. The data processing device is further configured to transfer the changed status information of the at least one parameter of the at least one data object to the data application device.

15 Claims, 2 Drawing Sheets

(51) Int. Cl.
*B60W 40/105* (2012.01)
*H04L 67/12* (2022.01)

(56) References Cited

U.S. PATENT DOCUMENTS

2009/0240392 A1* 9/2009 Yamashita .............. H03M 7/46
 701/31.4
2010/0019965 A1 1/2010 Xiao

OTHER PUBLICATIONS

International Search Report and Written Opinion for International Application No. PCT/DE2018/200039, dated Aug. 7, 2018, 9 pages.

* cited by examiner

DATA TRANSFER DEVICE AND METHOD FOR TRANSFERRING DATA FOR A VEHICLE

CROSS REFERENCE TO RELATED APPLICATIONS

This application is the U.S. National Phase Application of PCT International Application No. PCT/DE2018/200039, filed Apr. 26, 2018, which claims priority to German Patent Application No. 10 2017 207 285.7, filed Apr. 28, 2017, the contents of such applications being incorporated by reference herein.

FIELD OF THE INVENTION

The present invention relates to a data transfer device for transferring data in a communications network for a vehicle.

BACKGROUND OF THE INVENTION

Vehicle-to-X communications (V2X) based on IEEE 802.11p for vehicles is currently being introduced commercially. Vehicle-to-X communications (V2X) enhances the capabilities of vehicles for digital communication with the intention of increasing safety for the participating traffic participants and to optimize traffic flow. In V2X communications, data are transferred wirelessly between the individual participants. The individual participants are generally configured as control devices. The wireless transfer generally takes place at a data rate of approximately 6 Mbit per second. Additionally, the data to be transmitted are coded according to ASN.1, and packed encoding rules are even sometimes used. When the data to be transferred are to be combined in a control device with other data, for example, environmental data from other sensors, this substantially increases the amount of data to be transferred in the vehicle. A high-performance but expensive communications bus, for example, an Ethernet communications bus or FlexRay communications bus, is required in order to link the participating control devices in the vehicle. With its maximum bandwidth of 500 Kbit per second, a CAN bus system which is usually used within the communications network inside of a vehicle is no longer sufficient for transferring such an amount of data when there is an environment sensor fusion between individual control devices.

SUMMARY OF THE INVENTION

Therefore, an aspect of the present invention is a data transfer device for a vehicle which enables a transfer of high data rates between a V2X control device and further control devices in the vehicle while at the same time employing a cost-effective communications bus.

According to a first aspect, the invention relates to a data transfer device for the transfer of data in a communications network for a vehicle, comprising a data receiving device with an antenna device for receiving data which were sent by a data transmitting device, a data processing device for processing the received data which are transferable from the data receiving device to the data processing device via a first communications interface, wherein the data processing device is linkable via a second communications interface to at least one data application device for the transfer of the processed data, wherein the data processing device is configured to filter the received data via a filter device based on a predetermined condition, and wherein the data processing device is configured to generate at least one data object with at least one parameter from the filtered data, wherein the data processing device is further configured to check whether or not status information of the at least one parameter of the at least one data object has changed relative to status information of this at least one parameter of this at least one data object at an earlier time, and wherein the data processing device is further configured to transfer the changed status information of the at least one parameter of the at least one data object to the data application device.

The vehicle may be a motor vehicle, in particular a passenger motor vehicle, a commercial motor vehicle, a motorcycle, an electric motor vehicle or a hybrid motor vehicle.

A data object can be generated from a plurality of received communications or messages which are sent from the data transmitting device to the vehicle. The data transmitting device can be configured as a further vehicle which may also be designated as second vehicle. However, the data transmitting device can also be configured as an infrastructure device, for example, a traffic light or a transmitting mast, or a communications device of a (mobile) traffic participant such as, for example, a pedestrian or a bicyclist, which sends a quantity of messages or communications to the vehicle via an air interface. These communications or messages are then received by the data receiving device of the data transfer device of the vehicle.

The received communications or messages can run through a step of pre-filtering in the data transfer device. This means that only the communications relevant for a pertinent data object to be prepared are filtered out of a pool of received communications. The quantity of data objects to be used can be reduced, for example, to ten data objects whose data and/or whose updated delta information are to be transferred to the respective data processing device.

The idea underlying an aspect of the present invention consists in that, before a transfer of data from the data processing device to the data application device via the second communications interface through a corresponding compression of these data in the form of at least one data object, it is first checked through a query whether or not status information of a parameter or of a plurality of parameters of the at least one data object has changed relative to an earlier query time. If so, then only a change in the status information, i.e., a delta between earlier status information and updated or newer status information of the pertinent parameter or of the pertinent parameters of the at least one data object, is transferred to the data application device via the second communications interface. Accordingly, always only the newest information, so-called delta information, with respect to earlier or older status information of a parameter or of a plurality of parameters of the at least one data object is transferred.

This achieves the advantage that valuable bandwidth can be saved during the transfer of data because not all of the status information of one or more parameters of the at least one data object is always sent. Accordingly, a communications bus which is limited to or designed for a determined data bandwidth, but which is more cost-effective because of this, for example, a CAN bus, can continue to be used in a V2X communications system for a vehicle even with a high data throughput. Accordingly, a data-intensive application in a V2X communications system, for example, an environment sensor fusion, can also be carried out in a cost-effective and efficient manner using a CAN communications bus system.

The data transfer device according to an aspect of the invention achieves the further advantage that the available bandwidth of a communications interface in the form of a communications bus is utilized to the optimum extent through a corresponding compression of data before the actual transfer of these data from the data transfer device to the relevant data application device, since the amount of data to be transferred per defined cycle is reduced or limited in total to a required minimum as a result of the compression.

According to an embodiment form of the present invention, the data processing device comprises a storage device in order to store the at least one data object that is generated. This achieves the advantage that the at least one data object to be generated and the status information of the at least one parameter of this at least one data object are storable. In this way, the data processing device can detect a change in the status information of the at least one parameter of the at least one data object in that status information of the at least one parameter of the at least one data object at an earlier point in time which is stored in the storage device is compared with status information of the at least one parameter of the at least one data object at a more recent time. Accordingly, the relevant delta of changed status information of the at least one parameter of the at least one data object compared with an earlier or older query time can be detected in a simple and efficient manner in this way.

According to an embodiment form of the present invention, the data processing device has a processor. This achieves the advantage that one or more corresponding data objects which comprise a parameter or a plurality of parameters can be generated from the received data which are sent to the data transfer device by the data transmitting device as communications or messages. Each of these parameters in turn comprises at least one item of status information whose value can change correspondingly. A parameter can be, for example, a state of a vehicle light. If its state changes, i.e., if the vehicle light in question is switched on, for example, the status information of this parameter also changes.

According to an embodiment form of the present invention, the data processing device is configured to send a reference data object of the at least one data object to the data application device when the data transfer device determines that the transfer of the at least one data object to the data application device is taking place for the first time. This achieves the advantage that a complete dataset of the generated data objects need only be sent to the data application device one time and all of the data of the other data objects need not also be transferred again at the same time, or transferred anew, each time status information of a parameter of the at least one data object changes. The data application device is then configured to deposit the complete datasets of the individual data objects transferred to it in a suitable manner, for example, in the form of a reference table or a list in which the data objects and the data thereof are recorded. The changes in the respective status information of the parameters of the respective data object sent to the data application device are then written into a reference table of this kind. Accordingly, the data objects stored in the reference table and the individual values thereof, i.e., the status information about parameters of these stored data objects, are constantly updated.

According to an embodiment form of the present invention, the second communications interface is configured as a communications bus, particularly as a CAN bus. This achieves the advantage that a cost-effective communications bus can be used in the V2X communications system for transferring the at least one data object, and data-intensive applications, for example, a sensor fusion, is nevertheless runnable and executable. This renders the use of higher-power, but also expensive, communications bus systems superfluous.

According to an embodiment form of the present invention, the data processing device is configured to transfer the generated at least one data object to the data application device based on a clock signal which is generatable by a clock generator and which is sendable to the data processing device in defined, particularly adjustable, time intervals. This achieves the advantage that, after a defined time, for example, after ten seconds, the data relating to the data objects in the transmitting control device, i.e., the data processing device, and the data relating to the data objects in the receiving control device, i.e., the data application device, are synchronized. Another possibility consists in transferring anew all information relating to the existing data objects and the respective status information relating to the associated parameters after a defined quantity of changes in status information of the at least one parameter of the at least one data object, for example, after 100 transfers. In this way, the robustness of the overall system can be ensured. However, another procedure can consist in transferring anew a total dataset comprising all of the data objects existing at a defined time from the data processing device to the data application device after a determined amount of data in bytes of delta transfers, i.e., the transferring of changes of status information of parameters of individual data objects.

According to an embodiment form of the present invention, the data application device comprises a storage device to store the received at least one data object in a predetermined data format. This achieves the advantage that the data objects stored in a predetermined data format and the current status of the data objects are retrievable at any time with a predetermined degree of detail, i.e., for example, a defined quantity of information bits, i.e., also by other control devices.

According to an embodiment form of the present invention, the predetermined data format of the data application device is configured to store the received at least one data object as a list or a table which is producible by the data application device. This achieves the advantage that a table of this kind, also referred to as reference table, stores all of the data objects sent to the data application device according to a definable system. The contents of this table, i.e., the individual data objects, are accordingly uniquely localizable or addressable via table addresses, particularly also for other control devices in the data application device.

According to an embodiment form of the present invention, the at least one parameter of the at least one data object comprises information about a position and/or a time indication and/or about a speed of the data transmitting device. This achieves the advantage that, along with the transfer of data to the data transfer device, the corresponding characteristics or state information of the data transmitting device such as a position indication or a speed indication or a state of a technical component of the data transmitting device are also transferred. The format of these characteristics or state information of the data transmitting device which are to be transferred, i.e., the respective position, the time indication or the speed, can be expressed differently: with respect to the time indication, an absolute universal time can be specified and those bits which define the indication of an exact or determined day are omitted. With respect to position information, the upper bits, for example, can be omitted. Accordingly, while a position is repeated, for example, every 5 km, the location of the transmitter can be unambiguously reconstructed from the existing residual data with a reception range of, e.g., less than 2.5 km.

Further optimizations with respect to the amount of data to be transferred from the data processing device to the data application device may look like the following:

For example, it would be sufficient if an absolute position is stored in a table together with an absolute time stamp and/or a speed value of a generated data object in a receiving control device of the data application device when this table encompasses a correspondingly large period of time. For example, a few seconds are sufficient in this case. The data to be transferred from the data processing device to the data application device can then take a reference to this table so that the transfer of data can then be optimized in the following manner:

Only a change or a delta at a system time already stored in the data application device is sent. The system time at the time when the data are sent to the communications bus is used.

A relative position, for example, from an angle indication and a distance or a distance per spatial axis, is used, where the "relative position of an (external) object" means that relative position existing at the time the respective communication is received by the data receiving device.

An indication of a relative speed of the data transmitting device is used, where "relative speed" means the relative speed existing at the time the respective communication or message from the data transmitting device is received by the data receiving device.

According to an embodiment form of the present invention, the changed status information in the case of a position indication of the at least one parameter of the at least one data object constitutes a relative position of the data transmitting device at a defined time. This has the advantage that only partial information relating to a determined object position need be transferred based on an indication of an absolute position which was stored beforehand in a table of the data application device, which reduces the amount of data to be transferred to the data application device.

According to an embodiment form of the present invention, the changed status information in the case of a time indication of the at least one parameter of the at least one data object constitutes a difference with respect to the system clock time of the data transfer device. This achieves the advantage that only partial information relating to a time indication need be transferred based on an indication of an absolute time which was stored beforehand in a table of the data application device, which likewise reduces the amount of data to be transferred to the data application device.

According to an embodiment form of the present invention, the changed status information in the case of a speed indication of the at least one parameter of the data object constitutes a relative speed of the data transmitting device at a defined time. This achieves the advantage that only partial information relating to a determined speed of the data transmitting device, namely, a relative speed indication, need be transferred based on an indication of an absolute speed which was stored beforehand in a table of the data application device, which reduces the amount of data to be transferred to the data application device.

According to an embodiment form of the present invention, the at least one parameter of the at least one data object comprises information about a state of a technical component of the data transmitting device. This achieves the advantage that only changes in a state of a technical component, for example, a light status of a particular light in the vehicle, are transferred, but the state or the status of all of the vehicle lights need not always be transferred to the data application device.

According to an embodiment form of the present invention, the data processing device is configured to transfer current status information of the at least one data object stored in the storage device of the data processing device to the data application device after a predetermined quantity of transfers of changes in the status information of the at least one parameter of the at least one data object or after a predetermined period of time. This achieves the advantage that the data relating to the data objects in the control device transmitting the data, i.e., the data processing device, and the data relating to the data objects in the receiving control device, i.e., the data application device, are synchronized at defined intervals, which results in a greater robustness of the overall system.

According to an embodiment form of the present invention, the data processing device is configured to generate a first data object and at least one second data object from the received data. This achieves the advantage that a plurality of communications received by the vehicle are bundled according to defined criteria, for example, by means of a corresponding pre-filtering, and are processed to form one or more data objects which are then transferable to the data application device. Accordingly, the transfer of large amounts of data is more efficient and the available bandwidth is utilized to optimum extent.

According to a second aspect, the invention relates to a method for transferring data within a communications network of a vehicle, wherein the data transfer device comprises a data receiving device, a data processing device which is connectable to the data receiving device via a first communications interface, and at least one data application device which is connectable to the data processing device via a second communications interface, with the following steps: receiving data via the data receiving device which were sent by a data transmitting device; filtering the received data based on a predetermined condition through the data processing device; receiving at least one data object from the filtered data through the data processing device, wherein the at least one generated data object has at least one parameter; checking through the data processing device whether or not status information of the at least one parameter of the at least one data object has changed relative to status information of this at least one parameter of the at least one data object at an earlier time; and transferring the changed status information of the at least one parameter of the at least one data object to the data application device. The advantages which have already been described are achieved with the method according to an aspect of the invention.

According to a third aspect, the invention relates to a vehicle with a data transfer device for transferring data in a communications network of this vehicle.

Aspects of the invention can be realized in software and/or hardware.

BRIEF DESCRIPTION OF THE DRAWINGS

Further embodiment examples are described in more detail with reference to the accompanying figures. Therein.

DETAILED DESCRIPTION OF THE PREFERRED EMBODIMENTS

Figure 1:
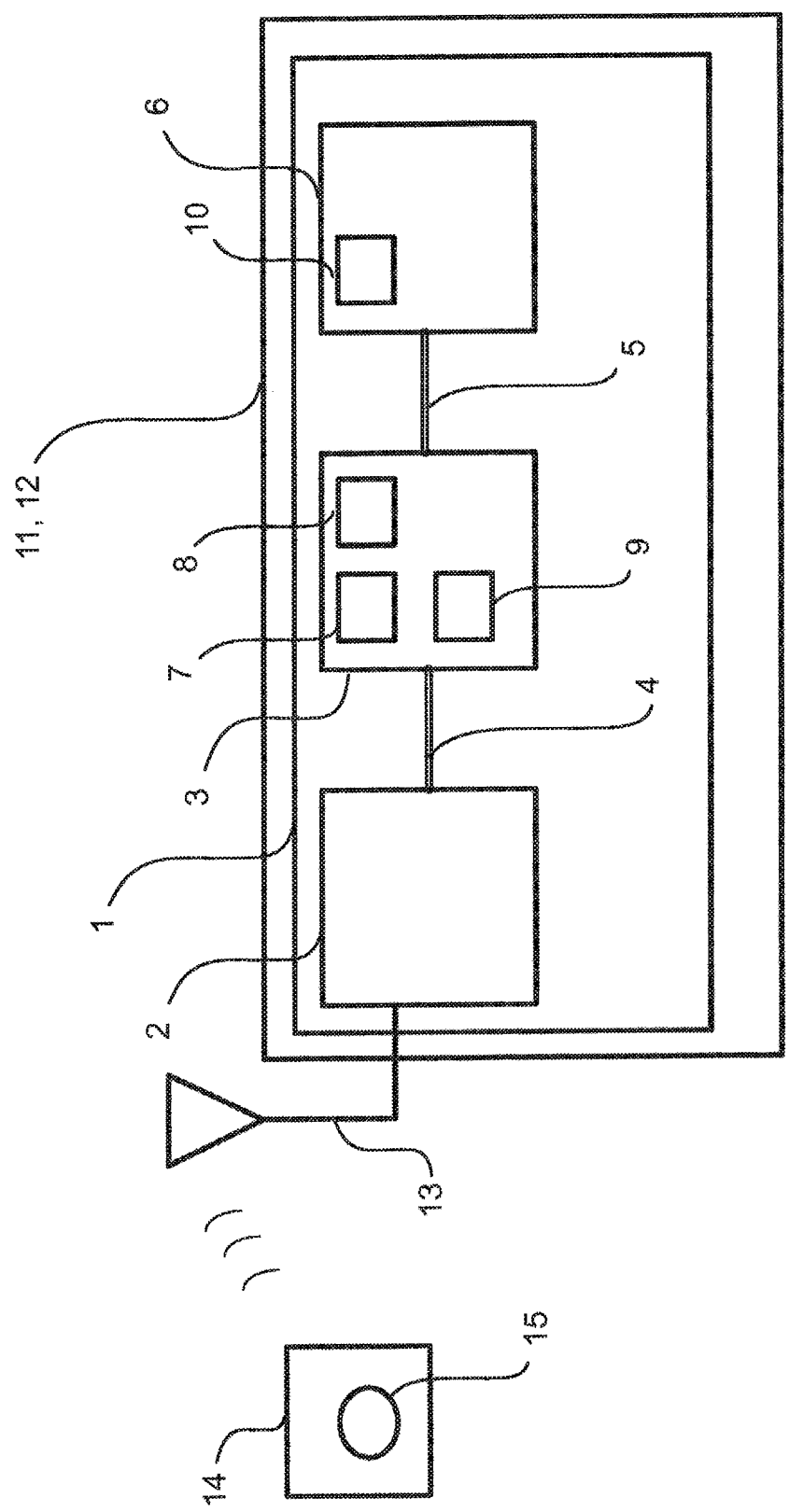
FIG. 1 shows a schematic illustration of a data transfer device for a vehicle according to an embodiment form of the present invention.

FIG. 1 shows a schematic illustration of an embodiment form of a data transfer device 1 for transferring data in a communications network 11, which can be configured as a V2X communications network, for a vehicle 12. In the context of an aspect of the present invention, the vehicle 12 may be considered as a first vehicle. The communications network 11 can in this case be an integral component part of the (first) vehicle 12. The data transfer device 1 according to FIG. 1 comprises a data receiving device 2 with an antenna device 13 for receiving data which were sent by a data transmitting device 15.

The data transmitting device 15 can be configured as a further vehicle which can also be designated as a second vehicle 14. However, the data transmitting device 15 can also be configured as an infrastructure device, for example, a traffic light or a transmitting mast, or a communications device of a (mobile) traffic participant, for example, a pedestrian or a bicyclist, which sends a quantity of messages or communications to the first vehicle 12 via an air interface.

In the context of an aspect of the present invention, a communication or a message which is sent by the data transmitting device 15 to the data transfer device 1 is understood, for example, as information about a position or a speed of the data transmitting device 15, for example, a vehicle or a pedestrian, at a determined point in time.

The data transfer device 1 further comprises a data processing device 3 for processing the received data which are transferable to the data processing device 3 from the data receiving device 2 via a first communications interface 4. According to FIG. 1, the data processing device 3 is connected via a second communications interface 5 to a data application device 6 for transferring the processed data. The data processing device 3 is configured to filter the received data via a filter device 7, which may be interpreted as a kind of pre-filtering, based on a predetermined condition.

According to FIG. 1, the data processing device 3 comprises a processor 8. The data processing device 3 is configured to generate at least one data object with at least one parameter from the filtered data via this processor 8 and, further, to check whether or not status information of the at least one parameter of the at least one data object has changed relative to status information of this at least one parameter of this at least one data object at an earlier time. If this is the case, the data processing device 3 transfers or transmits the changed status information of the at least one parameter of the at least one data object to the data application device 6. Within the meaning of an aspect of the present invention, "earlier time" means a point in time or a query time at which so-to-speak first status information of the at least one parameter of the at least one data object is present. The change of this first status information to second status information of this at least one parameter of this at least one data object, for example, because a status of a technical component such as a light status of a vehicle light has changed, is then transferred to the data application device 6. The second communications interface 5 can be configured as a CAN communications bus system which is inexpensive to operate.

The data processing device 3 and the data application device 6 may be considered as individual control devices within the communications network 11 of the vehicle 12.

The data transfer device 1 can comprise a (first) storage device 9 to store data. These data can include the generated data objects which were generated from the data of the data transmitting device 15 which were received by the data receiving device 2. However, these data can also be the received communications or messages of the data transmitting device 15 themselves which are stored or buffered and are to be used at a later point in time, for example, for generating one or more data objects.

The at least one data object can comprise a first data object and at least one second data object which are transferred from the data processing device 3, which functions as a transmitter, via the second communications interface 5 to the data application device 6 which functions as a receiver.

The data processing device 1 is configured to send a so-called reference data object of the at least one data object to the data application device 6 when the data transfer device 1 determines that the transfer of the generated at least one data object to the data application device 6 takes place for the first time. In this way, a complete data set of the data objects generated in the data processing device 3 is placed in the data application device 6 and is stored, preferably in a predetermined data format, in a (second) storage device 10 of the data transfer device 1 which is provided for this purpose and which is located in the data application device 6. This data format can be configured as a list or a table in which the sent data objects, for example, ten data objects, are recorded. Accordingly, it is sufficient that only the above-mentioned changes of status information relating to at least one parameter of at least one data object which are detected by the data processing device 3 are sent to the data application device 6 at later times of transfer. This data application device 6 correspondingly stores these changes, also called delta information, or the newest information relating to one or more relevant data objects, for example, in a data object list or in a table prepared expressly by it. Accordingly, the corresponding values of the parameters of the reference data objects stored in the data application device are updated by overwriting through the transferred changes or delta information.

In this way, the individual data objects can be unambiguously localized at any time, also by other control devices of the vehicle 12. The transfer of the most recent information or delta information has the advantage that a complete dataset of all existing data objects need not always be transferred every time data are transferred to the data application device 6, which would occupy a very large bandwidth; a communications bus such as a CAN bus would not be designed for this purpose. This compression of data, in which only the delta information relating to status information of at least one parameter of the at least one data object are assembled prior to the actual transfer, enormously reduces the data load to be transferred and accordingly also saves bandwidth.

Accordingly, the respective data object or reference object which is already stored in the data application device 6 is always referenced during the transfer of delta information or changed status information. However, to ensure the robustness of the overall system, it is useful to regularly synchronize the data pools of data objects between the data processing device 3 and the data application device 6. This is carried out by transferring the complete datasets, i.e., transferring all available data relating to the data objects which have already been applied. Therefore, the data processing device 3 can be configured to transfer current status information of the at least one data object which is already stored in the storage device 9 of the data processing device 3, or status information that is more current relative to an earlier time or query time, to the data application device 6 after a predetermined quantity of transfers of changes of the status information of the at least one parameter of the at least one data object or after a predetermined period of time. Accordingly, in this sense, a complete dataset of existing data objects and status information items thereof relating to their parameters at a determined time is transferred to the data application device 6 for the purpose of synchronization.

This regular transfer of complete datasets relating to existing and/or newly applied data objects or the transfer of delta information relating to individual data objects to data application device 6 can be carried out based on a clock signal which is generated by a clock generator (not shown in FIG. 1) arranged in the data transfer device 1 and which is sent to the data processing device 3 for this purpose. These time intervals of synchronization and transfer of delta information and of the most recent changes relating to status information of individual parameters of at least one data object can be individually adjusted.

The at least one parameter of the at least one data object can comprise information relating to a position and/or a time indication and/or relating to a speed of the data transmitting device 15.

With respect to a time indication of the at least one parameter of the at least one data object, the changed status information can comprise a difference relative to the system clock time of the data transfer device 1. Accordingly, only a delta relating to the system time is sent to the data application device 6. The system time relative to the time when the data is provided to the communications bus is used.

With respect to a position indication, the changed status information of the at least one parameter of the at least one data object can be a relative position of the data transmitting device 15 at a defined time. The position of the data transmitting device 15 at the time that the relevant communication is received by the data receiving device 2 of the data transfer device 1 can be taken as relative position. This transfer of a relative position is particularly advantageous when an absolute position is already stored in the data application device 6 together with an absolute time stamp in the relevant table or list and this table comprises a correspondingly large period of time, for example, a few seconds. The data to be sent can then be referenced to this table.

With respect to a speed indication of the at least one parameter of the at least one data object, the changed status information can be a relative speed of the data transmitting device 15 at a defined point in time.

Additionally, the at least one parameter of the at least one data object can also comprise information about a state of a technical component of the data transmitting device 15, for example, the light status of a vehicle light. When a change is transferred in the manner described above, then only the corresponding change in the light status of the relevant vehicle light, but not the light status of all vehicle lights, would be transferred to the data application device 6.

Figure 2:
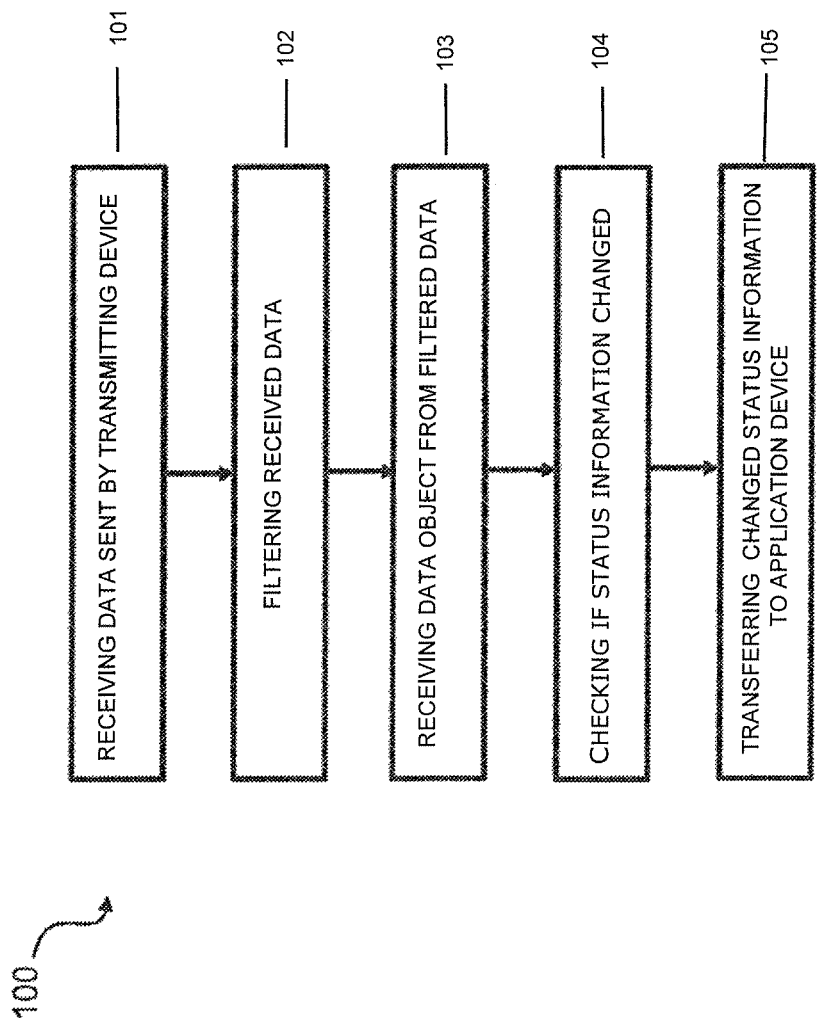
FIG. 2 shows a diagram of a method for a transfer of data by means of a data transfer device within a communications network of a vehicle.

FIG. 2 shows a diagram of a method 100 for transferring data with a data transfer device 1 within a communications network 11 of a vehicle 12, wherein the data transfer device 1 comprises a data receiving device 2, a data processing device 3 which is connectable to the data receiving device 2 via a first communications interface 4, and at least one data application device 6 which is connectable to the data processing device 3 via a second communications interface 5.

The method 100 comprises a first step of receiving 101, via the data receiving device 2, data which were sent by a data transmitting device 15. The method 100 comprises a second step of filtering 102 the received data based on a predetermined condition through the data processing device 3. The method 100 comprises a third step of receiving 103 at least one data object from the filtered data through the data processing device 3, wherein the at least one generated data object has at least one parameter. The method 100 comprises a fourth step of checking 104 by the data processing device 3 whether or not status information of the least one parameter of the at least one data object has changed relative to status information of this at least one parameter of the at least one data object at an earlier time. The method 100 comprises a fifth step of transferring 105 the changed status information of the at least one parameter of the at least one data object to the data application device 6.

LIST OF REFERENCE NUMERALS 1 data transfer device
2 data receiving device
3 data processing device
4 first communications interface
5 second communications interface
6 data application device
7 filter device
8 processor
9 storage device of the data processing device
10 storage device of the data application device
11 communications network
12 (first) vehicle
13 antenna device
14 second vehicle
15 data transmitting device
100 method
101 receiving data
102 filtering received data
103 generating at least one data object
104 checking by the data processing device
105 transferring the changed status information

The invention claimed is:

1. A data transfer device for the transferring data in a communications network for a vehicle, comprising:
    a data receiving device with an antenna device for receiving data which were sent by a data transmitting device; and
    a data processing device for processing the received data which are transferable from the data receiving device to the data processing device via a first communications interface, wherein the data processing device is linkable via a second communications interface to at least one data application device for the transfer of the processed data, wherein the data processing device is configured to filter the received data via a filter device based on a predetermined condition,
    wherein the data processing device is configured to generate at least one data object with at least one selected parameter from among the filtered data,
    wherein the data processing device is further configured to determine whether or not status information of the at least one selected parameter of the at least one data object has changed relative to status information of the at least one selected parameter of the at least one data object at an earlier time, and
    wherein the data processing device is further configured to:

transfer the changed status information of the at least one selected parameter of the at least one data object to the data application device when it is determined that the status information of the at least one selected parameter of the at least one data object has changed relative to status information of the at least one selected parameter of this at least one data object at an earlier time, and do not transfer the status information of the at least one selected parameter of the at least one data object to the data application device when it is determined that the status information of the at least one selected parameter of the at least one data object has not changed relative to status information of the at least one selected parameter of the at least one data object at an earlier time.

2. The data transfer device according to claim 1, wherein the data processing device comprises a storage device in order to store the at least one data object that is generated.

3. The data transfer device according to claim 1, wherein the data processing device is configured to send a reference data object of the at least one data object to the data application device when the data transfer device determines that the transfer of the at least one data object to the data application device is taking place for the first time.

4. The data transfer device according to claim 1, wherein the second communications interface is configured as a communications bus, particularly a CAN bus.

5. The data transfer device according to claim 1, wherein the data processing device is configured to transfer the generated at least one data object to the data application device based on a clock signal which is generatable by a clock generator and which is sendable to the data processing device in defined, particularly adjustable, time intervals.

6. The data transfer device according to claim 1, wherein the data application device comprises a storage device to store the received at least one data object in a predetermined data format.

7. The data transfer device according to claim 6, wherein the predetermined data format of the data application device is configured to store the received at least one data object as a list or a table which is producible by the data application device (6).

8. The data transfer device according to claim 1, wherein the at least one parameter of the at least one data object comprises information about a position and/or a time indication and/or about a speed of the data transmitting device.

9. The data transfer device according to claim 1, wherein the changed status information in the case of a position indication of the at least one parameter of the at least one data object constitutes a relative position of the data transmitting device at a defined time.

10. The data transfer device according to claim 1, wherein the changed status information in the case of a time indication of the at least one parameter of the at least one data object constitutes a difference with respect to the system clock time of the data transfer device.

11. The data transfer device according to claim 1, wherein the changed status information in the case of a speed indication of the at least one parameter of the at least one data object constitutes a relative speed relative position of the data transmitting device at a defined time.

12. The data transfer device according to claim 1, wherein the at least one parameter of the at least one data object comprises information about a state of a technical component of the data transmitting device.

13. The data transfer device according to claim 1, wherein the data processing device is configured to transfer current status information of the at least one data object stored in the storage device of the data processing device to the data application device after a predetermined quantity of transfers of changes in the status information of the at least one parameter of the at least one data object or after a predetermined period of time.

14. A method for the transfer of data with a data transfer device within a communications network of a vehicle, wherein the data transfer device comprises a data receiving device, a data processing device which is connectable to the data receiving device via a first communications interface, and at least one data application device which is connectable to the data processing device via a second communications interface, the method comprising:

receiving data via the data receiving device which were sent by a data transmitting device;

filtering the received data based on a predetermined condition through the data processing device;

receiving at least one data object from among the filtered data through the data processing device, wherein the at least one generated data object has at least one selected parameter;

determining through the data processing device whether or not status information of the at least one selected parameter of the at least one data object has changed relative to status information of the at least one selected parameter of the at least one data object at an earlier time;

transferring the changed status information of the at least one selected parameter of the at least one data object to the data application device when it is determined that the status information of the at least one selected parameter of the at least one data object has changed relative to status information of the at least one selected parameter of this at least one data object at an earlier time; and not transferring the status information of the at least one selected parameter of the at least one data object to the data application device when it is determined that the status information of the at least one selected parameter of the at least one data object has not changed relative to status information of the at least one selected parameter of the at least one data object at an earlier time.

15. A vehicle with a data transfer device for transferring data in a communications network for a vehicle, the data transfer device comprising:

a data receiving device with an antenna device for receiving data which were sent by a data transmitting device; and a data processing device for processing the received data which are transferable from the data receiving device to the data processing device via a first communications interface, wherein the data processing device is linkable via a second communications interface to at least one data application device for the transfer of the processed data, wherein the data processing device is configured to filter the received data via a filter device based on a predetermined condition, wherein the data processing device is configured to generate at least one data object with at least one selected parameter from among the filtered data, wherein the data processing device is further configured to determine whether or not status information of the at least one selected parameter of the at least one data object has changed relative to status information of the at least one selected parameter of the at least one data object at an earlier time, and wherein the data processing device is further configured to:

transfer the changed status information of the at least one selected parameter of the at least one data object to the data application device when it is determined that the status information of the at least one selected parameter of the at least one data object has changed relative to status information of the at least one selected parameter of this at least one data object at an earlier time, and do not transfer the status information of the at least one selected parameter of the at least one data object to the data application device when it is determined that the status information of the at least one selected parameter of the at least one data object has not changed relative to status information of the at least one selected parameter of the at least one data object at an earlier time.

* * * * *